United States Patent
Zhou et al.

(10) Patent No.: US 7,834,102 B2
(45) Date of Patent: *Nov. 16, 2010

(54) COMPOSITION USEFUL AS AN ADHESIVE FOR INSTALLING VEHICLE WINDOWS

(75) Inventors: Lirong Zhou, Rochester Hills, MI (US); Daniel P. Heberer, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 1115 days.

This patent is subject to a terminal disclaimer.

(21) Appl. No.: 11/510,234

(22) Filed: Aug. 25, 2006

(65) Prior Publication Data

US 2006/0293489 A1    Dec. 28, 2006

Related U.S. Application Data

(60) Provisional application No. 10/921,635, filed on Aug. 19, 2004, now Pat. No. 7,101,950, provisional application No. 60/497,277, filed on Aug. 22, 2003.

(51) Int. Cl.
*C08F 20/00* (2006.01)
*C08G 73/00* (2006.01)
*C08G 18/00* (2006.01)

(52) U.S. Cl. .............. 525/440.01; 528/65; 528/66; 524/872; 156/331.4; 156/331.7

(58) Field of Classification Search .......... 525/440.01, 525/457, 458, 440, 460; 528/65, 66; 524/872; 156/331.4, 331.7
See application file for complete search history.

(56) References Cited

U.S. PATENT DOCUMENTS

| | | | |
|---|---|---|---|
| 2,221,199 A | 11/1940 | Hasegawa et al. | |
| 3,707,521 A | 12/1972 | Santis | |
| 3,779,794 A | 12/1973 | De Santis | |
| 3,931,077 A | 1/1976 | Uchigaki et al. | |
| 4,525,511 A | 6/1985 | Kirby et al. | |
| 4,666,968 A | 5/1987 | Downey et al. | |
| 4,778,845 A | 10/1988 | Tschan et al. | |
| 4,780,520 A | 10/1988 | Rizk et al. | |
| 4,808,255 A | 2/1989 | Markevka et al. | |
| 4,820,368 A | 4/1989 | Markevka et al. | |
| 5,015,321 A | 5/1991 | Jansen et al. | |
| 5,019,638 A | 5/1991 | Müller et al. | |
| 5,034,453 A | 7/1991 | Takada et al. | |
| 5,162,457 A * | 11/1992 | Hansel et al. | 525/454 |
| 5,166,300 A | 11/1992 | Rumon | |
| 5,166,302 A | 11/1992 | Werner et al. | |
| 5,266,600 A | 11/1993 | Tenmyo et al. | |
| 5,288,797 A | 2/1994 | Khalil et al. | |
| 5,342,873 A | 8/1994 | Merz et al. | |
| 5,367,036 A | 11/1994 | Saito et al. | |
| 5,441,808 A | 8/1995 | Anderson et al. | |
| 5,525,663 A | 6/1996 | Oien | |
| 5,550,191 A | 8/1996 | Hung et al. | |
| 5,559,196 A * | 9/1996 | Stobbie et al. | 525/458 |
| 5,574,114 A | 11/1996 | Stobbie et al. | |
| 5,660,887 A | 8/1997 | Werenicz et al. | |
| 5,698,656 A | 12/1997 | Ohashi et al. | |
| 5,721,311 A | 2/1998 | Oien | |
| 5,744,088 A | 4/1998 | De Cuyper | |
| 5,747,581 A | 5/1998 | Proebster et al. | |
| 5,753,747 A | 5/1998 | Oien et al. | |
| 5,824,743 A | 10/1998 | Krawczyk et al. | |
| 5,869,593 A * | 2/1999 | Helmeke et al. | 528/83 |
| 5,900,473 A | 5/1999 | Acevedo et al. | |
| 5,922,809 A | 7/1999 | Bhat et al. | |
| 5,939,488 A | 8/1999 | Nowicki et al. | |
| 5,976,305 A | 11/1999 | Bhat et al. | |
| 5,998,538 A | 12/1999 | Meckel et al. | |
| 6,001,204 A | 12/1999 | Hälg et al. | |
| 6,015,475 A | 1/2000 | Hsieh et al. | |
| 6,133,398 A | 10/2000 | Bhat et al. | |

(Continued)

FOREIGN PATENT DOCUMENTS

EP    492824    7/1992

(Continued)

OTHER PUBLICATIONS

JP04175392, Derwent, Accession No. 1992-256568, Sansuta Giken KK, Jun. 23, 1992.

(Continued)

*Primary Examiner*—Milton I Cano
*Assistant Examiner*—Michael Leonard
(74) *Attorney, Agent, or Firm*—Dobrusin & Thennisch PC

(57) ABSTRACT

The invention is an composition comprising
  a) one or more isocyanate functional polyether based prepolymers;
  b) one or more isocyanate functional polyester prepolymers wherein the one or more polyesters used to prepare the prepolymers having melting points of from about 45 to about 59° C.;
  c) one or more polyisocyanates having a nominal functionality of about 3 or greater;
  d) one or more nonconductive carbon blacks;
  e) one or more catalysts for the reaction of isocyanates moieties with hydroxyl groups. In a preferred embodiment the composition of the invention further comprises one or more isocyanate functional polyester prepolymers wherein the one or more polyesters used to prepare the prepolymers having melting points of about 60 to about 90° C.

19 Claims, No Drawings

U.S. PATENT DOCUMENTS

| | | | |
|---|---|---|---|
| 6,133,400 | A | 10/2000 | Helmeke |
| 6,221,978 | B1 | 4/2001 | Li et al. |
| 6,353,078 | B1 | 3/2002 | Murata et al. |
| 6,365,700 | B1 | 4/2002 | Graham |
| 6,610,811 | B1 | 8/2003 | Westfechtel et al. |
| 6,660,376 | B1 | 12/2003 | Zimmel et al. |
| 6,709,539 | B2 | 3/2004 | Zhou |
| 6,749,943 | B1 | 6/2004 | Tangen et al. |
| 2002/0056518 | A1 | 5/2002 | Shah |
| 2002/0061962 | A1* | 5/2002 | Zhou ............................ 525/30 |
| 2002/0100550 | A1 | 8/2002 | Mahdi et al. |
| 2002/0157789 | A1 | 10/2002 | Imai et al. |
| 2002/0164486 | A1 | 11/2002 | Guse et al. |
| 2003/0045636 | A1* | 3/2003 | Krebs et al. ................. 525/127 |
| 2003/0070741 | A1 | 4/2003 | Rosenberg et al. |
| 2003/0149214 | A1 | 8/2003 | Westfechtel et al. |

FOREIGN PATENT DOCUMENTS

| | | |
|---|---|---|
| EP | 405300 | 11/1994 |
| FR | 0 764 670 | * 3/1997 |

OTHER PUBLICATIONS

JP04198387, Derwent Accession No. 1993:149030, Yasukazu Zenki et al., Jul. 17, 1992.

EP340,586, Derwent, Accession No. 1989-325866, M. Dollhausen et al., Nov. 8, 1989.

JP05025455, Derwent, Accession No. 1993-080625, Yasukazu Zenki, Feb. 2, 1993.

JP06128551, Derwent, Accession No. 1995:117484, Katsuyoshi Fukuda et al, May 10, 1994.

JP06271832, Derwent, Accession No. 1994-347336, Yasukazu Zenki et al., Sep. 27, 1994.

JP07126600, Derwent, Accession No. 1995-213214, Sekisui Chem, May 16, 1995.

JP07149856, Derwent, Accession No. 1995-243660, Nippon Latex Kako KK, Jun. 13, 1995.

JP07070538, Derwent, Accession No. 1995:145089, Masatake Yoshikawa et al., Mar. 14, 1995.

JP09279118, Derwent, Accession No. 1997:731416, Koichiro Nakamura et al., Oct. 28, 1997.

JP2000037794, Derwent, Accession No. 2000:88324, Satoru Kusuda, Feb. 8, 2000.

JP2001192635, Derwent, Accession No. 2001:517734, Yoshihiro Nakata et al., Jul. 17, 2001.

JP11060673, Derwent, Accession No. 1999:142445, Takao Yoshida et al., Mar. 2, 1999.

* cited by examiner

COMPOSITION USEFUL AS AN ADHESIVE FOR INSTALLING VEHICLE WINDOWS

CROSS REFERENCE TO RELATED APPLICATIONS

This application is a Continuation of application Ser. No. 10/921,635 filed on Aug. 19, 2004, now U.S. Pat. No. 7,101,950, which claims the benefit of U.S. Provisional Application No. 60/497,277, filed Aug. 22, 2003, which now abandoned.

The invention relates to a composition useful as an adhesive which is useful in bonding glass into vehicles and buildings. In another embodiment, the invention is a method of bonding two or more substrates together, wherein such substrates may include glass, buildings and vehicles. In another embodiment, the invention is a method of replacing a window in a vehicle using the composition of the invention.

BACKGROUND OF INVENTION

Adhesive compositions are used to affix (bond) glass (windows) into buildings and vehicles, see Rizk, U.S. Pat. No. 4,780,520; Bhat, U.S. Pat. No. 5,976,305; Hsieh et al, U.S. Pat. No. 6,015,475 and Zhou, U.S. Pat. No. 6,709,539, all incorporated herein by reference. In automobile factories windows are installed using robots and computer controlled processing. This facilitates the use of a variety of high performance adhesives used on a variety of automobiles, for instance nonconductive adhesives and high modulus adhesives. Further, new vehicles are not driven a significant distance for several days after window installation, and thus the speed of cure is not a significant issue. Conversely, when a vehicle needs a window replaced, it is often performed in a remote location by an installer working from a vehicle. In this environment, speed of cure is important as the vehicle owner desires to drive the vehicle away as soon as possible after installation on the window. Adhesives useful in replacing windows for vehicles which facilitate fast drive away times are known see Bhat, U.S. Pat. No. 5,976,305 and Zhou, U.S. Pat. No. 6,709,539. The introduction of various high performance adhesive compositions used for installing windows in automobile factories presents a problem for replacement window installers. First adhesives that meet all the varied performance requirements are not available in the market place. Second, it is difficult to formulate many high performance adhesive compositions to allow rapid drive away times, such as one hour and more preferably 30 minutes. Thus, a replacement window installer often has to carry a variety of adhesives so that the installer can match the adhesive to the properties of the original adhesive. It is also difficult to formulate a high performance adhesive that does not sag, that is, lose the shape of the adhesive bead applied to the vehicle or the glass.

Adhesives have been developed which provide good initial green strength that allows the adhesive to hold the glass in place without additional fixturing to hold the glass in place. This is achieved through the inclusion of crystalline polyesters in the adhesive. These adhesives have hot melt properties that require that the adhesive be melted and applied hot. As the adhesive cools the polyester portion crystallizes and provides initial green strength to hold the glass in place, see Proebster U.S. Pat. No. 5,747,581, incorporated herein by reference. The problem with these adhesives is that they require heat to apply and the use of complex equipment including a heater for their use. The initial green strength provided is not sufficient for rapid drive away time. In the replacement glass industry segment rapid strength development is necessary to allow safe rapid drive away times. Because of the use of polyester based polyurethane adhesives in the automobile window replacement market, many installers insist on heating adhesives prior to applying the adhesive to the window or the window flange. Many adhesives when heated demonstrate sagging, that is the deformation as the result of gravitational forces. This deformation if severe enough can interfere in the proper installation and sealing of the window into the vehicle.

Windows in buildings and vehicles are installed and replaced in a variety of environmental conditions. Many of the present adhesive compositions are limited with respect to the environmental conditions of application. As a result window installers often need to use different adhesives based on the environmental conditions.

What is needed is a composition which is useful as an adhesive for bonding glass into a vehicle which exhibits a variety of high performance properties (such as high modulus and nonconductive nature), exhibits fast safe drive away times when applied under a variety of conditions, fast strength development, can be applied without the need for heating the adhesive, can be applied under a wide range of environmental conditions and does not sag when applied. Further, what is needed is an adhesive composition which does not sag when heated prior to application to temperatures of up to 80° C.

SUMMARY OF INVENTION

In one embodiment, the invention is an composition comprising
a) one or more isocyanate functional polyether based prepolymers;
b) one or more isocyanate functional polyester prepolymers wherein the one or more polyesters used to prepare the prepolymer having melting points of from about 45 to about 59° C.;
c) one or more polyisocyanates having a nominal functionality of about 3 or greater;
d) one or more nonconductive carbon blacks;
e) one or more catalysts for the reaction of isocyanate moieties with hydroxyl groups. In a preferred embodiment the composition of the invention further comprises one or more isocyanate functional polyester prepolymers wherein the one or more polyesters used to prepare the prepolymer have a melting point of about 60 to about 90° C.

In another embodiment the invention is a method of bonding two or more substrates together which comprises contacting the two or more substrates together with a composition according to this invention disposed along at least a portion of the area wherein the substrates are in contact.

In yet another embodiment the invention is a method of replacing a window of a vehicle comprising
i) removing the window from the vehicle;
ii) applying a composition according to the invention to a replacement window or to the flange of the vehicle adapted to hold the window into the vehicle;
iii) contacting the flange of the vehicle and the replacement window with the composition disclosed between the replacement window and the flange of the vehicle; and
iv) allowing the adhesive to cure.

The composition of the invention is useful as an adhesive to bond substrates together. A variety of substrates may be bonded together using the composition, for instance, plastics, glass, wood, ceramics, metal, coated substrates and the like. The compositions of the invention may be used to bond similar and dissimilar substrates together. The compositions are especially useful for bonding glass to other substrates such as vehicles and buildings. The compositions of the invention are also useful in bonding parts of modular components together, such as vehicle modular components. The glass can be bonded to coated and uncoated portions of vehicles. Advantageously the adhesive is pumpable, sag resistant and functional at temperatures between about 5 and about 80° C. This allows the adhesives prepared from the composition of the invention to be applied at a wide range of ambient temperatures. Heated application machinery is not necessary for the application of the adhesive. Furthermore, the adhesive demonstrates rapid strength development which facilitates rapid drive away times of preferably one hour, preferably 30 minutes, after application of the adhesive at temperatures of from about 0° F. (−18° C.) to about 115° F. (46° C.). In particular, windshields installed under such conditions meet United States Federal Motor Vehicle Safety Standard (FMVSS) 212. The compositions of the invention are nonconductive and demonstrate a volume resistivity of about $5 \times 10^{10}$ ohm·cm or greater. The compositions of the invention demonstrate a modulus after application for two weeks of about 2 MPa or greater, preferably about 2.2 MPa or greater and most preferably about 3 MPa or greater according to ASTM D4065. The compositions of the invention exhibit a storage modulus, G', of about $5.3 \times 10^5$ Pa or greater, preferably about 0.53 MPa or greater and most preferably about 1.0 MPa or greater. Pumpability of the composition can be measured according to the press flow viscosity test described hereinafter, according to that test the composition exhibits a press flow viscosity of about 20 to 50 seconds.

DETAILED DESCRIPTION OF INVENTION

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw material, incomplete conversion of the reactants and formation of by-products.

The one or more isocyanate functional polyether based prepolymers are present in sufficient quantity to provide adhesive character to the composition. Such prepolymers have an average isocyanate functionality sufficient to allow the preparation of a crosslinked polyurethane upon cure and not so high that the polymers are unstable. Stability in this context means that the prepolymer or adhesive prepared from the prepolymer has a shelf life of at least 6 months at ambient temperatures, in that it does not demonstrate an increase in viscosity during such period which prevents its application or use. Preferably the prepolymer or adhesive prepared therefrom does not undergo an increase in viscosity of more than about 50 percent during the stated period. Preferably, the average isocyanate functionality is at least about 2.2 and preferably at least about 2.4. Below about 2.2 the ability of the prepolymer to crosslink sufficiently to achieve the desired strength of the cured adhesive is compromised. Preferably the average isocyanate functionality of the prepolymer is 3.0 or less and more preferably 2.8 or less. Above 3.0 average isocyanate functionality the prepolymer and adhesives prepared from the prepolymer may exhibit unacceptable stability. The prepolymer preferably has a free isocyanate content, which facilitates acceptable strength in adhesives prepared from the prepolymers after 60 minutes and stability of the prepolymer. Preferably, the free isocyanate content is about 0.8 percent by weight or greater based on the weight of the prepolymer and more preferably about 0.9 percent by weight or greater, and preferably about 2.2 percent by weight or less, more preferably about 2.0 or less, even more preferably about 1.4 percent by weight or less and even more preferably about 1.1 percent by weight or less and most preferably about 1.0 percent by weight or less. Above about 2.2 percent by weight the adhesives prepared from the prepolymer may demonstrate lap shear strengths after 60 minutes which are too low for the intended use and foaming during cure of the adhesive prepared from the prepolymer may occur. Below about 0.8 percent by weight the prepolymer viscosity is too high to handle and the working time is too short.

The free isocyanate content changes with time as the free isocyanate groups react with moisture. Primary free isocyanate content means the isocyanate content measured within a short period of time, less than 1 hour, after production of the prepolymer. Secondary free isocyanate content means the weight percent of isocyanate groups present in the prepolymer about 24 hours after production of the prepolymer. The preferred isocyanate contents referred to above are secondary isocyanate contents.

The prepolymer preferably exhibits a viscosity, which facilitates formulation of a pumpable adhesive, which has good green strength. Preferably the viscosity of the prepolymer is about 100,000 centipoise (100 Pa s) or less and more preferably about 70,000 centipoise (70 Pa s)) or less, preferably about 30,000 centipoise (30 Pa s) or greater, and more preferably about 45,000 centipoise (45 Pa s) or greater. The viscosity used herein is Brookfield viscosity determined using a number 5 spindle. The viscosity of the adhesive can be adjusted with fillers, although the fillers cannot improve the green strength of the final adhesive. Below about 30,000 centipoise (30 Pa s) the adhesive prepared from the prepolymer may exhibit poor green strength. Above about 100,000 (100 Pa s) the prepolymer may be unstable and hard to dispense. The prepolymer may be prepared by any suitable method, such as by reacting polyols, such as diols, triols and dispersion triols with an excess over stoichiometry of one or more polyisocyanates under reaction conditions sufficient to form a prepolymer having isocyanate functionality and free isocyanate content which meets the criteria discussed above. In a preferable method used to prepare the prepolymer, the polyisocyanates are reacted with one or more diols, one or more triols and a dispersion triol.

Preferable polyisocyanates for use in preparing the prepolymer include those disclosed in U.S. Pat. No. 5,922,809 at column 3, line 32 to column 4, line 24 incorporated herein by reference. Preferably the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols. Polyols useful in this invention are diols and triols corresponding to the polyols described in U.S. Pat. No. 5,922,809 at column 4, line 60 to column 5, line 50, incorporated herein by reference. Preferably the polyols (diols and triols) are polyether polyols and more preferably polyoxyalkylene oxide polyols. Most preferred triols are ethylene oxide-capped polyols prepared by reacting glycerin with propylene oxide, followed by reacting the product with ethylene oxide.

Preferably the prepolymer also comprises a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference. Preferably the triol used to disperse the organic particles is a polyether triol and more preferably a polyoxyalkylene based triol. Preferably, such polyoxyalkylene oxide triol comprises a polyoxypropylene chain with a polyoxyethylene end cap. Preferably the triols used have a molecular weight of about 4,000 or greater, more preferably about 5,000 or greater and most preferably about 6,000 or greater. Preferably such triol has molecular weight of about 8,000 or less and more preferably about 7,000 or less. Below about 4,000 molecular weight the elongation and impact properties of the finally cured adhesive are too low for the intended use. Above about 8,000 molecular weight the adhesive prepared from the prepolymer is too elastomeric for the intended use. The triol preferably has a hydroxyl number which is high enough such that the adhesive prepared from the prepolymer cures rapidly enough and provides the desired open times. If the hydroxyl number is too low the adhesive cures too slowly and the desired open times and drive-away times cannot be achieved. The hydroxyl number should not be so high as to reduce the elongation of the cured adhesive prepared from the prepolymer. Preferably, the hydroxyl number of the triol is about 30 or greater and more preferably about 40 or greater. Preferably, the hydroxyl number of the triol is about 75 or less and more preferably about 60 or less.

Preferably the particles dispersed in the dispersion triol comprise a thermoplastic polymer, rubber-modified thermoplastic polymer or a polyurea dispersed in a triol. The polyurea preferably comprises the reaction product of a polyamine and a polyisocyanate. Preferable thermoplastic polymers are those based on monovinylidene aromatic monomers and copolymers of monovinylidene aromatic monomers with conjugated dienes, acrylates, methacrylates, unsaturated nitrites or mixtures thereof. The copolymers can be block or random copolymers. More preferably the particles dispersed in the triol comprise copolymers of unsaturated nitrites, conjugated dienes and a monovinylidene aromatic monomer, a copolymer of an unsaturated nitrile and a monovinylidene aromatic monomer or a polyurea. Even more preferably the particles comprise a polyurea or polystyrene-acrylonitrile copolymer with the polystyrene-acrylonitrile copolymers being most preferred. The organic polymer particles dispersed in the triol preferably have a particle size which is large enough to improve the impact properties and elastomeric properties of the finally cured adhesive, but not so large so as to reduce the ultimate strength of the adhesive after cure. Preferably the particle size is about 10 microns or greater and more preferably the particle size is about 20 microns or greater. Preferably the particle size is about 50 microns or less and more preferably the particle size is about 40 microns or less. The triol dispersion contains a sufficient amount of organic polymer particles such that the adhesive upon cure has sufficient hardness for the desired use and not so much such that the cured adhesive has too much elasticity as defined by elongation. Preferably the dispersion contains about 20 percent by weight or greater of organic polymer particles copolymer based on the dispersion, preferably about 30 percent by weight or greater and more preferably about 35 percent by weight or greater. Preferably the dispersion contains about 60 percent by weight or less of organic polymer particles based on the dispersion, preferably about 50 percent by weight or less and more preferably about 45 percent by weight or less.

The polyols (diols and triols and dispersion triols) are present in an amount sufficient to react with most of the isocyanate groups of the isocyanates leaving enough isocyanate groups to correspond with the desired free isocyanate content of the prepolymer. Preferably the polyols are present in an amount of about 30 percent by weight or greater based on the prepolymer, more preferably about 40 percent by weight or greater and most preferably about 55 percent by weight or greater. Preferably the polyols are present in an amount of about 75 percent by weight or less based on the prepolymer, more preferably about 65 percent by weight or less and most preferably about 60 percent by weight or less.

The weight ratio of diols to triols and dispersion triols is important to achieving the desired cure rate and strength of the adhesive. If the weight ratio is too low the formulation is too viscous to handle and the resulting adhesive has insufficient elasticity to retain glass in an automobile window frame under crash conditions. If the ratio is too high the adhesive does not have adequate green strength. The weight ratio of diol to triol and dispersion triol is preferably about 0.8 or greater and more preferably about 0.85 or greater and most preferably about 0.9 or greater. The weight ratio of diol to triol and dispersion triol is about 1.2 or less; more preferably about 1.0 or less and most preferably about 0.95 or less. In the embodiment where the polyols comprise a mixture of diols and triols, the amount of diols present is preferably about 15 percent by weight or greater based on the prepolymer, more preferably about 25 percent by weight or greater and most preferably about 28 percent by weight or greater; and about 40 percent by weight or less based on the prepolymer, more preferably about 35 percent by weight or less and most preferably about 30 percent by weight or less. In the embodiment where the polyols comprise a mixture of diols and triols, the amount of triols (non dispersion triol and dispersion triol) present is preferably about 15 percent by weight or greater based on the prepolymer, more preferably about 25 percent by weight or greater and most preferably about 28 percent by weight or greater; and preferably about 45 percent by weight or less based on the prepolymer, more preferably about 35 percent by weight or less and most preferably about 32 percent by weight or less.

The dispersion of organic polymer particles in a triol is present in the prepolymer in an amount of about 10 percent by weight or greater of the prepolymer and more preferably about 12 percent by weight or greater, and about 18 percent by weight or less of the prepolymer and more preferably about 15 percent by weight or less.

The polyurethane prepolymers of the invention may further comprise a plasticizer. The plasticizers useful in the prepolymer are common plasticizers useful in polyurethane adhesive applications and well known to those skilled in the art. The plasticizer is present in an amount sufficient to disperse the prepolymer in the final adhesive composition. The plasticizer can be added to the adhesive either during preparation of the prepolymer or during compounding of the adhesive composition. Preferably the plasticizer is present in about 1 percent by weight or greater of the prepolymer formulation (prepolymer plus plasticizer), more preferably about 20 percent by weight or greater and most preferably about 30 percent by weight or greater. Preferably the plasticizer is present in about 45 percent by weight or less of the prepolymer formulation and more preferably about 35 percent by weight or less.

The polyurethane prepolymer may be prepared by any suitable method, such as bulk polymerization and solution polymerization. Preferable processes for the preparation of the prepolymers are disclosed in U.S. Pat. No. 5,922,809 at column 9, line 4 to 51 incorporated herein by reference. The polyurethane prepolymers are present in the adhesive composition in an amount sufficient such that when the resulting adhesive cures substrates are bound together. Preferably the polyurethane prepolymers are present in an amount of about 25 parts by weight of the adhesive composition or greater, more preferably about 30 parts by weight or greater and most preferably about 35 parts by weight or greater. Preferably the polyurethane prepolymers are present in an amount of about 55 parts by weight of the adhesive composition or less, more preferably about 50 parts by weight or less and even more preferably about 45 parts by weight or less.

The composition further comprises an isocyanate functional prepolymer containing a first polyester based polyol. The first polyester based polyol has a melting point such that the prepolymer provides sufficient green strength to prevent the substrates from moving in relation to one another due to gravitational forces. In terms of installing a window in a vehicle or building, the first polyester based prepolymer prevents the window from sliding after installation. The first polyester based isocyanate prepolymer has a melting point sufficient to provide the needed green strength. Preferably the first polyester polyol has a melting point of about 40° C. or greater, even more preferably about 45° C. or greater and most preferably about 50° C. or greater. Preferably, the first polyester polyol exhibits a melting point of about 59° C. or less and most preferably about 55° C. or less. The first polyester based isocyanate prepolymer can be prepared using only the first polyester polyol or it may be prepared using a combination of the first polyester and other polyols. The amount of first polyester polyol in the prepolymer is a sufficient amount to provide the needed green strength to the composition of the invention. Preferably, the first polyester polyol is present in the first polyester polyol based isocyanate prepolymer in an amount of about 70 percent by weight or greater based on the weight of the prepolymer and more preferably about 80 percent by weight or greater. Preferably, the first polyester polyol is present in the first polyester polyol based isocyanate prepolymer in an amount of about 95 percent by weight or less based on the weight of the prepolymer and more preferably about 90 percent by weight or less. Preferably, the first polyester polyol based isocyanate prepolymer is present in the adhesive composition in sufficient amount to give the needed green strength. Preferably, the first polyester polyol based isocyanate prepolymer is present in the adhesive composition in an amount of about 1 percent by weight or greater based on the weight of the prepolymer and most preferably about 2 percent by weight or less. Preferably, the first polyester polyol is present in the first polyester polyol based isocyanate prepolymer in an amount of about 5 percent by weight or less based on the weight of the prepolymer and more preferably about 4 percent by weight or less. The first polyester polyol can be any polyester composition that meets the property requirements defined which is crystalline at ambient temperatures and melts in the desired temperature range. Preferred polyester polyols are prepared from linear diacids and linear diols. A more preferred diacid is adipic acid. More preferred diols are the $C_{2-6}$ diols, with butane diols, pentane diols and hexane diols being most preferred. The first polyester based polyisocyanate prepolymers can be prepared using the processes and isocyanates described hereinbefore.

In order to provide an adhesive composition which can be used to replace a wide variety of adhesive compositions and which can be used under a variety of application conditions including preheating of the adhesive at elevated temperatures, it is desirable to include in the composition of the invention a second polyester polyol based isocyanate prepolymer. The second polyester based polyol used in such prepolymer has a melting point such that the prepolymer provides sufficient sag resistance to prevent the deformation of the composition after application to a substrate due to gravitational forces. The second polyester based isocyanate prepolymer has a melting point sufficient to provide the needed sag resistance. Preferably the second polyester polyol has a melting point of about 60° C. or greater, even more preferably about 70° C. or greater and most preferably about 80° C. or greater. Preferably, the second polyester polyol exhibits a melting point of about 90° C. or less and most preferably about 85° C. or less. The second polyester based isocyanate prepolymer can be prepared using only the second polyester polyol or it may be prepared using a combination of the second polyester polyol and other polyols. The amount of second polyester polyol in the prepolymer is a sufficient amount to provide the needed sag resistance to the composition of the invention. Preferably, the second polyester polyol is present in the second polyester polyol based isocyanate prepolymer in sufficient amount to give the needed sag resistance. Preferably, the second polyester polyol is present in the second polyester polyol based isocyanate prepolymer in an amount of about 65 percent by weight or greater based on the weight of the prepolymer and more preferably about 70 percent by weight or greater. Preferably, the second polyester polyol is present in the second polyester polyol based isocyanate prepolymer in an amount of about 80 percent by weight or less based on the weight of the prepolymer and more preferably about 75 percent by weight or less. The amount of second polyester polyol isocyanate prepolymer in the adhesive composition is a sufficient amount to provide the needed sag resistance to the composition of the invention. Preferably, the second polyester polyol based isocyanate prepolymer is present in the adhesive composition in an amount of about 1 percent by weight or greater based on the weight of the prepolymer and most preferably about 2 percent by weight or less. Preferably, the second polyester polyol is present in the second polyester polyol based isocyanate prepolymer in an amount of about 5 percent by weight or less based on the weight of the prepolymer and more preferably about 4 percent by weight or less. The second polyester polyol can be any polyester composition available which meets the property requirements defined. Preferred second polyester polyols are prepared from Creanova under the trade name Dynacol and the designations 7330 and 7381, with 7381 more preferred. The second polyester based polyisocyanate prepolymers can be prepared using the processes and isocyanates described hereinbefore.

The composition of the invention further comprises a polyfunctional isocyanate for the purpose of improving the modulus of the composition in the cured form. Polyfunctional as used in the context of the isocyanates refers to isocyanates having a functionality of 3 or greater. The polyisocyanates can be any monomeric or polymeric isocyanate having a nominal functionality of about 3 or greater. More preferably the polyfunctional isocyanate has a nominal functionality of about 3.2 or greater. Preferably the polyfunctional isocyanate has a nominal functionality of about 5 or less, even more preferably about 4.5 or less and most preferably about 4.2 or less. The polyfunctional isocyanate can be any isocyanate which is reactive with the isocyanate polyisocyanate prepolymers used in the composition and which improves the modulus of the cured composition. The polyisocyanates can be monomeric; trimers, isocyanurates or biurets of monomeric isocyanates; or polymeric, the reaction product of several units of one or more monomeric isocyanates. Examples of preferred polyfunctional isocyanates include trimers of hexamethylene diisocyanate, available from Bayer under the trademark and designation Desmodur® N3300, and polymeric isocyanates such as polymeric MDI (methylene diphenyl diisocyanates) such as those marketed by The Dow Chemical Company under the trademark of PAPI™ including PAPI™ 20 polymeric isocyanate. The isocyanate polyisocyanates are present in sufficient amount to impact the modulus of the cured compositions of the invention. If too much is used the cure rate of the composition is unacceptably slowed down. If too little is used the desired modulus levels are not achievable. The polyfunctional isocyanate is preferably present in an amount of about 0.5 percent by weight or greater based on the weight of the composition, more preferably about 0.9 percent by weight or greater and most preferably about 1.5 percent by weight or greater. The polyfunctional isocyanate is preferably present in an amount of about 8 percent by weight or less, based on the weight of the composition, more preferably about 5 percent by weight or less and most preferably about 2.5 percent by weight or less.

The composition of the invention also comprises carbon black to give the composition the desired black color, viscosity and sag resistance. As some high performance adhesive compositions are required to be nonconductive, the carbon black used is nonconductive. Nonconductive carbon blacks are well known in the art and include Raven 1040 and Raven 1060 carbon black available from Colombian. One or more carbon blacks may be used in the composition provided the composition is nonconductive to the level defined herein. The amount of carbon black in the composition is that amount which provides the desired color, viscosity and sag resistance. The carbon black is preferably used in the amount of about 10 percent by weight or greater based on the weight of the composition, more preferably about 12 percent by weight or greater and most preferably about 14 percent by weight or greater. The carbon black is preferably present in an amount of about 35 percent by weight or less based on the weight of the composition, more preferably about 30 percent by weight or less and most preferably about 20 percent by weight or less.

The adhesive composition of the invention may further comprise a catalyst known for promoting the cure of polyurethanes in the presence of moisture. Preferable catalysts include metal salts such as tin carboxylates, organo titanates (such as alkyl titanates), metal carboxylates, and dimorpholinodiethyl ether or alkyl-substituted dimorpholinodiethyl ethers. Preferably, the catalyst comprises a mixture of metal carboxylates and one of dimorpholino-diethyl ether or an alkyl substituted dimorpholino diethyl ether. Preferred metal carboxylates include bismuth carboxylates. Among preferred catalysts are bismuth octoate, dimorpholinodiethyl ether and (di-(2-(3,5-dimethylmorpholino)ethyl))ether. Such catalysts, when employed are preferably employed in an amount based on the weight of the adhesive composition of about 0 parts by weight or greater, more preferably about 0.1 parts by weight or greater, even more preferably about 0.2 parts by weight or greater and most preferably about 0.4 parts by weight or greater. Such catalysts are preferably employed in an amount, based on the weight of the adhesive composition of about 5 parts by weight or less, more preferably about 1.75 parts by weight or less, even more preferably about 1 part by weight or less and most preferably about 0.6 parts by weight or less.

The adhesive of the invention may be formulated with fillers and additives known in the prior art for use in adhesive compositions. By the addition of such materials physical properties such as viscosity flow rates and the like can be modified. However, to prevent premature hydrolysis of the moisture sensitive groups of the polyurethane prepolymer, fillers should be thoroughly dried before admixture therewith.

Optional components of the adhesive of the invention include reinforcing fillers. Such fillers are well known to those skilled in the art and include carbon black, titanium dioxide, calcium carbonate, surface treated silicas, titanium oxide, fume silica, talc, and the like. Preferred reinforcing fillers comprise carbon black as described hereinbefore. In one embodiment, more than one reinforcing filler may be used, of which one is carbon black and a sufficient amount of carbon black is used to provide the desired black color to the adhesive. The reinforcing fillers are used in sufficient amount to increase the strength of the adhesive and to provide thixotropic properties to the adhesive.

Among optional materials in the adhesive composition are clays. Preferred clays useful in the invention include kaolin, surface treated kaolin, calcined kaolin, aluminum silicates and surface treated anhydrous aluminum silicates. The clays can be used in any form, which facilitates formulation of a pumpable adhesive. Preferably the clay is in the form of pulverized powder, spray-dried beads or finely ground particles. Clays may be used in an amount of about 0 parts by weight of the adhesive composition or greater, more preferably about 1 part by weight or greater and even more preferably about 6 parts by weight or greater. Preferably the clays are used in an amount of about 20 parts by weight or less of the adhesive composition and more preferably about 10 parts by weight or less.

The adhesive composition of this invention may further comprise plasticizers so as to modify the rheological properties to a desired consistency. Such materials should be free of water, inert to isocyanate groups and compatible with a polymer. Suitable plasticizers are well known in the art and preferable plasticizers include alkyl phthalates such as dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene and alkyl naphthalenes. The amount of plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably plasticizers are used in the adhesive composition in an amount of about 0 parts by weight or greater based on the weight of the adhesive composition, more preferably about 5 parts by weight or greater and most preferably about 10 parts by weight or greater. The plasticizer is preferably used in an amount of about 45 parts by weight or less based on the total amount of the adhesive composition and more preferably about 40 parts by weight or less.

The composition of this invention may further comprise stabilizers, which function to protect the adhesive composition from moisture, thereby inhibiting advancement and preventing premature crosslinking of the isocyanates in the adhesive formulation. Stabilizers known to the skilled artisan for moisture curing adhesives may be used preferably herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The composition of this invention may further comprise an adhesion promoter, such as those disclosed in Mahdi, US Patent Publication 2002/0100550 paragraphs 0055 to 0065 and Hsieh, U.S. Pat. No. 6,015,475 column 5 line 27 to Column 6, line 41 incorporated herein by reference. The amounts of such adhesion promoters useful are also disclosed in these references and incorporated herein by reference.

The adhesive composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrolidinones such as 1 methyl-2-pyrolidinone, available from under the trademark m-pyrol. The hydrophilic material is preferably present in an amount of about 0.1 percent by weight or greater and more preferably about 0.3 percent by weight or greater and preferably about 1.0 percent by weight or less and most preferably about 0.6 percent by weight or less. Optionally the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the adhesive of composition in a sufficient amount to give the desired rheological properties. Preferably, the thixotrope is present in an amount of about 0 parts by weight or greater based on the weight of the adhesive composition, preferably about 1 part by weight or greater. Preferably, the optional thixotrope is present in an amount of about 10 parts by weight or less based on the weight of the adhesive composition and more preferably about 2 parts by weight or less.

Other components commonly used in adhesive compositions may be used in the adhesive composition of this invention. Such materials are well known to those skilled in the art and may include ultraviolet stabilizers and antioxidants and the like.

As used herein all parts by weight relative to the components of the adhesive composition are based on 100 total parts by weight of the adhesive composition.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example, U.S. Pat. Nos. 4,525,511; 3,707,521 and 3,779,794, relevant parts of all are incorporated herein by reference. Generally the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably the adhesive of the invention is formulated to provide a working time of about 6 minutes or greater more preferably about 10 minutes or greater. Preferably the working time is about 15 minutes or less and more preferably about 12 minutes or less.

The adhesive composition is preferably used to bond glass to other substrates such as metal or plastics. In a preferred embodiment the first substrate is a glass window and the second substrate is a window frame. In another preferred embodiment the first substrate is a glass window and the second substrate is a window frame of an automobile. Preferably, the glass window is cleaned and has a glass primer applied to the area to which the adhesive is to be bonded.

In a preferred embodiment the composition of the invention is used to replace windows in structures or vehicles and most preferably in vehicles. The first step is removal of the previous window. This can be achieved by cutting the bead of the adhesive holding the old window in place and then removing the old window. Thereafter the new window is cleaned and primed. The old adhesive that is located on the window flange can be removed, although it is not necessary and in most cases it is left in place. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

In another embodiment the compositions of the invention can be used to bond modular components together. Examples of modular components include vehicle modules, such as door, window or body.

Viscosities as described herein are determined according to the procedure disclosed in Bhat, U.S. Pat. No. 5,922,809 at column 12 lines 38 to 49, incorporated herein by reference.

Molecular weights as described herein are determined according to the following to the procedure disclosed in Bhat U.S. Pat. No. 5,922,809 at column 12 lines 50 to 64, incorporated herein by reference.

In reference to polyurethane prepolymers, average isocyanate functionality is determined according to the procedure disclosed in Bhat, U.S. Pat. No. 5,922,809 at column 12 lines 65 to Column 13, line 26, incorporated herein by reference.

Illustrative Embodiments of the Invention

The following examples are provided to illustrate the invention, but are not intended to limit the scope thereof. All parts and percentages are by weight unless otherwise indicated.

Preparation of Polyether Prepolymer

A polyether polyurethane prepolymer was prepared by mixing 980 g of a polyoxypropylene diol having an average molecular weight of 2,000 with 595 g of a polyoxypropylene triol having an average molecular weight of 4500 and 455 g of a styrene acrylonitrile dispersed polyoxypropylene triol with an average molecular weight of 5400. Mixing was carried out in a reactor by heating the mixture to 48° C. 320 g of dipheylmethane-4,4'-diisocyanate and 0.17 g of stannous octoate was added to the mixture. The whole mixture was then reacted for one hour at 80° C. Finally, 1120 g of a dialkyl phthalate plasticizer was added to the mixture and the mixing was continued for one hour.

Preparation of Polyester Prepolymer 1

A polyester polyurethane prepolymer was prepared by charging 175 g of a dialkyl phthalate plasticizer to a reaction vessel and heating to 48° C. To this 108 g of diphenylmethane-4,4'-diisocyanate (MDI) was added and mixed to insure that the MDI was molten. Then 717 g of molten linear copolyester diol (Dynacoll 7381) was slowly added and allowed to react for thirty minutes. The maximum temperature allowed is 88° C. The polyester used demonstrated a melting point of 60-62° C.

Preparation of Polyester Prepolymer 2

A polyester polyurethane prepolymer was prepared by charging 175 g of a dialkyl phthalate plasticizer to a reaction vessel and heating to 48° C. To this 108 g of diphenylmethane-4,4'-diisocyanate was added and mixed to insure that the MDI was molten. Then 717 g of molten linear copolyester diol (Dynacoll 7330) was slowly added and allowed to react for thirty minutes. The maximum temperature allowed is 88° C. The polyester used demonstrated a melting point of 80-85° C.

Preparation of Polyester Prepolymer 3

A polyester polyurethane prepolymer was prepared by charging 150 g of diphenylmethane-4,4'-diisocyanate to a reaction vessel and heating to 48° C. Then, 850 g of a molten linear polyester diol (Dynacoll 7360) was slowly added and mixed. The materials were allowed to react for 30 minutes with a maximum allowable temperature of 88° C. The polyester used demonstrated a melting point of 53-55° C.

Compounding of Adhesives

All of the adhesives were made according to the following compounding procedure using the raw material percentages listed in Tables 1 and Tables 2 below. The only change between the different formulations is the compounding temperature. Adhesives without the polyester prepolymers were made at room temperature; otherwise, the mixing vessel was heated to 85° C., 85° C., and 55° C. respectively for the three polyester polyurethane prepolymers of Examples 2 to 4. If a combination of these three prepolymers was used the mixing vessel was increased to the higher temperature.

The mixing vessel was heated to the desired temp according to the polyester polyurethane prepolymers used. The appropriate amounts of polyether prepolymer and multifunctional isocyanate (Desmodur® N3300 or PAPI™ 2020) were charged to the vessel and degassed under vacuum for 15 minutes. The polyester polyurethane prepolymers were then added and the materials were degassed under vacuum for an additional 15 minutes. The carbon black and clay fillers were added and mixed for five minutes at slow speed under vacuum until the fillers were sufficiently wetted by the prepolymers. The mixing speed was increased and the fillers dispersed for 20 minutes. Finally, the dimorpholino diethyl ether and bismuth octoate catalysts and the N-methyl pyrolidone were added to the mixing vessel and the mixture was mixed under vacuum for an additional 10 minutes.

Testing Procedures

DMA Modulus: The storage modulus of the fully cured adhesives was determined at 25° C. by using a DMA from TA Instruments according to the ASTM Method D 4065.

Volume Resistivity: The volume resistivity of the fully cured adhesives was determined by using a Hewlett Packard 16008B Resistivity and a 4339B High Resistance Meter. A 40 mm square, 2 mm thick sample was placed in direct contact with the electrodes and an applied voltage of 100V was used to determine the volume resistivity in units of ohm cm. Values greater than $5*10^{10}$ are considered to have low conductivity.

Storage Modulus (Green Strength) at Short Cure Times: The storage modulus of the adhesives was determined at short cure times through the use of a Dynamic Stress Rheometer (DSR). The DSR was programmed to apply a stress at a frequency of five rad/sec using 8 mm parallel plate geometry with a plate separation height of 1 mm. The adhesive sample was applied to the plates and the storage modulus was recorded every 2 minutes for the first two hours at the indicated temperatures.

High Temperature Sag Test: An important performance property of an adhesive is the ability to maintain the appropriate bead shape after application. A test of this property is a sag test wherein an 8 mm by 12 mm isosceles triangle bead of the adhesive is dispensed with a standard caulking gun onto a surface held at a 60° angle from horizontal. Acceptable performance is a minimal deflection of the bead tip; no defection or change in shape is preferred. The test used here was conducted on the adhesives after aging for 10 hours at 80° C. The adhesives were dispensed while still hot at 80° C. and the amount of sag was recorded as the number of mm of deflection of the bead tip.

Press Flow Viscosity: The press flow viscosity is determined as the time (seconds) required to extrude 20 grams of adhesive through a capillary. The width of the capillary is fixed at 0.203" (25.4 mm) and the applied pressure is 80 psi ($5.5 \times 10^5$ Pa). Unless otherwise noted, all press flow viscosity values were determined at 23+/−1° C.

Results

Table 1 describes the formulations tested and the results.

The tested adhesives can be dispensed at room temperature (typically demonstrating a press flow viscosity range of between 20 and 50 seconds for materials that will be applied with a caulking gun).

When no polyester prepolymer or when only a low melting polyester (Examples 1 and 2, respectively) is used, the materials have poor sag resistance at 80° C. The incorporation of a small percentage of a higher melting temperature polyester, polyester prepolymers 2 and 3 in Examples 3 and 4 respectively, solves the sag issue without adversely affecting the room temperature viscosity.

The G' modulus, however, is strongly affected by the incorporation of small amounts of a multifunctional isocyanate, see Examples 3 and 4.

TABLE 1

| | Formulation/Example #: | | | |
|---|---|---|---|---|
| | 1 | 2 | 3 | 4 |
| Polyether Prepolymer | 58.5 | 63 | 63 | 63 |
| Multifunctional Isocyanate 1 | 2 | | 1 | 1 |
| DMDEE | 0.3 | 0.4 | 0.36 | 0.36 |
| Bismuth Octoate | 0.2 | 0.25 | 0.2 | 0.2 |
| M-Pyrol ™ | 0.3 | 0.3 | 0.3 | 0.3 |
| Clay | 22.7 | 15.05 | 13.14 | 13.14 |
| Carbon Black, nonconductive | 16 | 16 | 16 | 16 |
| polyester prepolymer 1 | | 5 | 3 | 3 |
| polyester prepolymer 2 | | | 3 | |
| polyester prepolymer 3 | | | | 3 |
| Total | 100.0 | 100 | 100 | 100 |
| Storage Modulus (MPa) | | | 23.5 | 24.4 |
| Conductivity (Ohm cm) | 7.45E+14 | 7.03E+14 | 1.68E+15 | 2.67E+15 |
| Rheology (sag in mm) | >10 | 0 | 0 | 0 |
| Press Flow Viscosity (sec) | 15 | 30 | 34 | 31 |
| Green Strength G' (Pa) by DSR at 23° C. Time Hours | | | | |
| 0 | | 1.29E+03 | 6.74E+04 | 1.19E+05 | 2.04E+05 |
| 0.5 | | 2.62E+03 | 3.40E+05 | 2.74E+05 | 5.18E+05 |
| 1 | | 1.64E+04 | 6.88E+05 | 6.03E+05 | 9.56E+05 |

TABLE 1-continued

| | Formulation/Example #: | | | |
|---|---|---|---|---|
| | 1 | 2 | 3 | 4 |
| 1.5 | 5.57E+04 | 1.02E+06 | 1.00E+06 | 1.34E+06 |
| 2.0 | 1.17E+05 | 1.34E+06 | 1.33E+06 | 1.70E+06 |

Multifunctional isocyanate 1 is Desmodur ® N3300 isocyanate
DMDEE is dimorpholino diethyl ether
The carbon black is Raven 1040 carbon black.

What is claimed is:

1. A composition comprising
   a) one or more isocyanate functional polyether based prepolymers comprising the reaction product of:
      i) one or more polyisocyanates;
      ii) a mixture of one or more polyether diols and one or more polyether triols; and
      iii) a dispersion triol, wherein the triol is a polyoxyalkylene triol having a molecular weight of about 4,000 to about 8,000 and having a hydroxyl number of from about 30 to about 75, containing from about 10 to about 60 percent by weight based on the dispersion of organic polymer particles having a particle size of from about 10 to about 50 microns;
   b) one or more isocyanate functional polyester prepolymers wherein the one or more polyesters used to prepare the prepolymers having melting points of from about 40 to about 59° C.;
   c) one or more polyisocyanates having a nominal functionality of about 3 or greater;
   d) one or more nonconductive carbon blacks; and
   e) one or more catalysts for the reaction of isocyanate moieties with hydroxyl groups.

2. A composition according to claim 1 which further comprises one or more isocyanate functional polyester prepolymers wherein the one or more polyesters used to prepare the prepolymers have melting points of about 60 to about 90° C.

3. A composition according to claim 2 wherein the composition demonstrates upon cure a modulus of 2.0 MPa or greater at 25° C. measured according to ASTM D4065; a volume resistivity of $5 \times 10^{10}$ ohm cm or greater; a sag of an uncured sample of less than 2 mm, a press flow viscosity of about 20 to about 50 and a storage modulus of about $5.3 \times 10^5$ Pa or greater.

4. A composition according to claim 2 wherein
   a) the one or more isocyanate functional polyether based prepolymers are present in an amount of about 25 to about 55 percent;
   b) the one or more isocyanate functional polyester prepolymers wherein the one or more polyesters used to prepare the prepolymers having melting points of from about 45 to about 55° C. are present in an amount of about 1 to about 5 percent;
   c) one or more polyfunctional isocyanates are present in an amount of about 1 to about 8 percent;
   d) one or more nonconductive carbon blacks are present in an amount of about 5 to about 25 percent;
   e) one or more catalysts for the reaction of isocyanate moieties with hydroxyl groups are present in an amount of about 0.005 to about 2 percent; and
   f) one or more isocyanate functional polyester prepolymers wherein the one or more polyesters used to prepare the prepolymers having melting points of about 75 to about 90° C. are present in an amount of about 1 to about 5 percent;

wherein the percentages are based on the weight of the composition.

5. A composition according to claim 4 wherein the composition bonds to glass and to coated substrates.

6. A method of bonding two or more substrates together which comprises contacting the two or more substrates together with a composition of claim 1 disposed along at least a portion of the area wherein the substrates are in contact.

7. A method according to according to claim 6 wherein the composition further comprises one or more isocyanate functional polyester prepolymers wherein the one or more polyesters used to prepare the prepolymers having melting points of about 60 to about 90° C.

8. A method according to claim 7 wherein the isocyanate functional polyether prepolymers comprise one or more one or more dispersion polyols containing particles of an organic polymer.

9. A method according to claim 8 wherein
   a) the one or more isocyanate functional polyether based prepolymers are present in an amount of about 25 to about 55 percent;
   b) the one or more isocyanate functional polyester prepolymers wherein the one or more polyesters used to prepare the prepolymers having melting points of from about 40 to about 59° C. are present in an amount of about 1 to about 5 percent;
   c) one or more polyfunctional isocyanates are present in an amount of about 1 to about 8 percent;
   d) one or more nonconductive carbon blacks are present in an amount of about 5 to about 25 percent;
   e) one or more catalysts for the reaction of isocyanate moieties with hydroxyl groups are present in an amount of about 0.005 to about 2 percent; and
   f) one or more isocyanate functional polyester prepolymer wherein the one or more polyesters used to prepare the prepolymers having melting points of about 60 to about 90° C. are present in an amount of about 1 to about 5 percent;
   wherein the percentages are based on the weight of the composition.

10. The method of claim 7 wherein the at least one of the substrates is window glass.

11. The method of claim 10 wherein at least one of the other substrates is a building or a vehicle.

12. The method of claim 11 wherein the substrate is a vehicle.

13. A method according to claim 12 wherein the composition demonstrates upon cure a modulus of 2.0 MPa or greater at 25° C. measured according to ASTM D4065; a volume resistivity of $5 \times 10^{10}$ ohm cm or greater; a sag of an uncured sample of less than 2 mm, a press flow viscosity of about 20 to about 50 seconds and a storage modulus of about $5.3 \times 10^5$ Pa or greater.

14. A method of replacing a window of a vehicle comprising
   i) removing the window from the vehicle;
   ii) applying a composition of claim 1 to a replacement window or to the flange of the vehicle adapted to hold the window into the vehicle;
   iii) contacting the flange of the vehicle and the replacement window with the composition disposed between the replacement window and the flange of the vehicle; and
   iv) allowing the adhesive to cure.

15. A method according to according to claim 14 wherein the composition further comprises one or more isocyanate functional polyester prepolymers wherein the one or more polyesters used to prepare the prepolymers having melting points of about 60 to about 90° C.

16. The method of claim 15 wherein the vehicle can be safely driven after 60 minutes from installation of the window into the vehicle.

17. A method according to claim 15 wherein the isocyanate functional polyether prepolymers comprise one or more one or more dispersion polyols containing particles of an organic polymer.

18. A method according to claim 15 wherein
 a) the one or more isocyanate functional polyether based prepolymers are present in an amount of about 25 to about 55 percent;
 b) the one or more isocyanate functional polyester prepolymers wherein the one or more polyesters used to prepare the prepolymers having melting points of from about 40 to about 59° C. are present in an amount of about 1 to about 5 percent;
 c) one or more polyfunctional isocyanates are present in an amount of about 1 to about 8 percent;
 d) one or more nonconductive carbon blacks are present in an amount of about 5 to about 25 percent;
 e) one or more catalysts for the reaction of isocyanate moieties with hydroxyl groups are present in an amount of about 0.005 to about 2 percent; and
 f) one or more isocyanate functional polyester prepolymer wherein the one or more polyesters used to prepare the prepolymers having melting points of about 60 to about 90° C. are present in an amount of about 1 to about 5 percent;
 wherein the percentages are based on the weight of the composition.

19. A method according to claim 15 wherein the composition demonstrates upon cure a modulus of 2.0 MPa or greater at 25° C. measured according to ASTM D4065; a volume resistivity of $5 \times 10^{10}$ ohm cm or greater; a sag of an uncured sample of less than 2 mm, a press flow viscosity of about 20 to about 50 seconds, and a storage modulus of about $5.3 \times 10^5$ Pa or greater.

* * * * *